Patented Aug. 3, 1937

2,088,996

UNITED STATES PATENT OFFICE 2,088,996

DOUBLE COMPOUNDS OF SECONDARY AMIDES OF 3.5-DIMETHYL-ISOXAZOLE-4-CARBOXYLIC ACID AND PROCESS FOR THE MANUFACTURE OF SAME

Max Hoffer, Basel, Switzerland, assignor to Hoffmann-La Roche Inc., Nutley, N. J., a corporation of New Jersey No Drawing. Application November 20, 1936, Serial No. 111,966. In Germany November 22, 1935

6 Claims. (Cl. 260—44)

It has been found that the secondary amides of isoxazole carboxylic acids which have been described in the applicant's co-pending application No. 62,381 filed February 4, 1936, which have the structure:

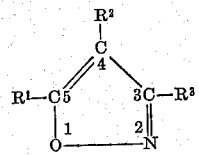

in which one of the radicals, $R^1$, $R^2$ or $R^3$, represents the group

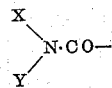

where X and Y are lower aliphatic radicals, and where the other R radicals represent alkyl or hydrogen, form crystalline double compounds with calcium sulphocyanate.

The secondary amides of 3,5-dimethyl-isoxazolecarboxylic acid are shown in the said co-pending application to be produced by conversion of the corresponding acids (such as are described in Ann., 277: 147, 1893, in Ber., 42; 60, 1909, or which are produced by the action of ethoxymethylene acetic esters on hydroxylamine) by the action of phosphoric pentachloride or thionylchloride to the acid chlorides and subsequently allowing these acid chlorides to react with dialkylamines.

According to the quantity of calcium sulphocyanate used in the reaction, the substances so obtained unite in the proportion of 2:1 or 1:2. As an example of this it is shown that 3,5-dimethyl-isoxazole-4-carboxylic acid diethylamide unites with calcium sulphocyanate in the proportion of 1 molecule to 2 molecules, respectively, to give a compound of the formula:

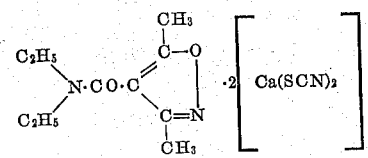

or in the proportion of 2 molecules of the secondary amide to 1 molecule of calcium sulphocyanate to give a compound of the formula

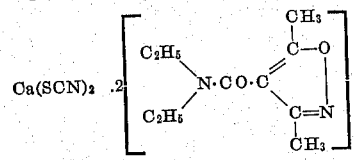

The chief value of the new double compounds consists in the possibility of transforming the secondary amides of 3,5-dimethyl-isoxazole-4-carboxylic acid, which are mostly liquid or compounds with a low melting point, into solid, stable products. It is a further advantage of the new compounds that the bitter or salty taste of the starting materials is reduced and often quite disappears.

The new compounds may be obtained by dissolving the components in suitable solvents. Often the double compound will crystallize directly from the solvent, or it may be precipitated by the addition of other solvents, in which it is difficultly soluble. It may likewise be obtained by evaporating the solvent. Instead of using the calcium salt as such it may be formed directly in the solution, for instance from calcium carbonate and the acid.

The new compounds are to be used as medicines, as they possess valuable properties as circulatory stimulants.

Example 1

196 parts by weight of 3,5-dimethyl-isoxazole-4-carboxylic-acid-diethylamide are dissolved with 550 parts by weight of crystalline calcium sulphocyanate in 1000 parts by weight of water. After some time and after cooling a double compound is crystallized from the solution which consists of 2 molecules of calcium sulphocyanate and one molecule of 3,5-dimethyl-isoxazole-4-carboxylic-acid-diethylamide. It is readily soluble in water and alcohol.

Example 2

280 parts by weight of 3,5-dimethyl-isoxazole-4-carboxylic-acid-di-isoamylamide are shaken with an aqueous solution of 350 parts by weight of crystalline calcium sulphocyanate and 1000 parts by weight of water. After some time the insoluble oil solidifies to a crystalline mass consisting of a double compound of calcium sulphocyanate and 3,5-dimethyl-isoxazole-4-carboxylic-acid-di-isoamylamide, which is difficultly soluble in water, easily soluble in alcohol.

Example 3

To 133 parts by weight of crystalline calcium sulphocyanate, dissolved in 100 parts by weight of water, 197 parts by weight of 3,5-dimethyl-isoxazole-4-carboxylic-acid-diethylamide are added. After 12 hours' standing in the refrigerator the double compound will have crystallized in large prisms. The liquid is rapidly drawn off by suction and the product dried at 60° C. The double compound thus obtained consists of 1 molecule of calcium sulphoncyanate and 2 molecules of 3,5-dimethyl-isoxazole-4-carboxylic-acid-diethylamide.

I claim:

1. The double compounds of secondary lower aliphatic amides of 3,5-dimethyl-isoxazole-4-carboxylic acid with calcium sulphocyanate which are solid, stable products easily soluble in alcohol, difficultly soluble in water and possess valuable properties as circulatory stimulants.

2. The double compound of one molecule of 3,5-dimethyl-isoxazole-4-carboxylic-acid-diethylamide with two molecules of calcium sulphocyanate which crystallizes in white needles, is easily soluble in alcohol and hot water, hardly soluble in cold water and possesses valuable properties as circulatory stimulant.

3. The double compound of two molecules of 3,5-dimethyl-isoxazole-4-carboxylic-acid-diethylamide with one molecule of calcium sulphocyanate which crystallizes in large prisms, is easily soluble in alcohol and hot water, hardly soluble in cold water and possesses valuable properties as circulatory stimulant.

4. A process for the manufacture of double compounds of secondary lower aliphatic amides of 3,5 - dimethyl - isoxazole - 4 - carboxylic acid, which consists in allowing secondary amides of 3,5-dimethyl-isoxazole-4-carboxylic acid to react with calcium sulphocyanate.

5. A process for the manufacture of a double compound of 3,5-dimethyl-isoxazole-4-carboxylic-acid-diethylamide, which consists in allowing 3,5-dimethyl-isoxazole-4-carboxylic-acid-diethylamide to react with a large excess of calcium sulphocyanate.

6. A process for the manufacture of a double compound of 3,5-dimethyl-isoxazole-4-carboxylic-acid-diethylamide, which consists in allowing two molecules of 3,5-dimethyl-isoxazole-4-carboxylic-acid-diethylamide to react with one molecule of calcium sulphocyanate.

MAX HOFFER.